Figure 1:
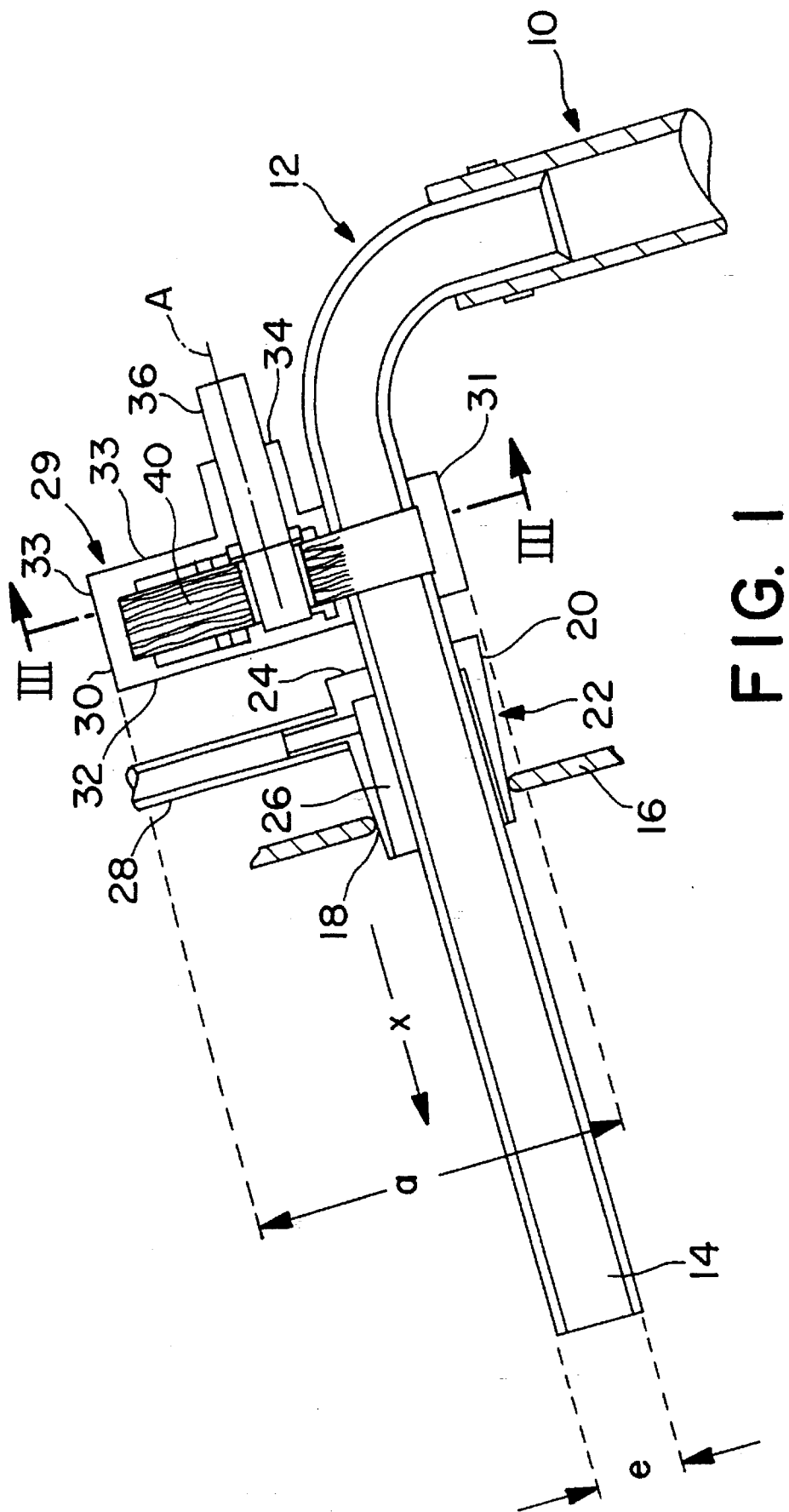

United States Patent [19]
Federhen

[11] Patent Number: 5,464,310
[45] Date of Patent: Nov. 7, 1995

[54] CONVEYOR CONDUIT FOR BULK MATERIAL TO BE PNEUMATICALLY CONVEYED

[75] Inventor: Bernd Federhen, Siegen, Germany

[73] Assignee: ALB. Klein GmbH & Co. KG, Niederfischbach, Germany

[21] Appl. No.: 63,649

[22] Filed: May 20, 1993

[30] Foreign Application Priority Data

Jul. 16, 1992 [DE] Germany .................. 42 23 370.4

[51] Int. Cl.⁶ ................................. B65G 53/34
[52] U.S. Cl. ............... 406/164; 406/192; 55/422; 55/477; 210/432; 210/435; 251/302
[58] Field of Search .................. 406/83, 84, 127, 406/128, 129, 130, 131, 132, 133, 154, 164, 168, 169, 171, 172, 175, 191, 192, 197, 198; 55/418, 422, 477; 210/418, 432, 435, 446, 447; 251/301, 302, 368; 222/74, 75, 189, 637, 189.01–189.11; 248/117.2, 117.3

[56] References Cited

U.S. PATENT DOCUMENTS 5,226,213  7/1993  Lewis et al. ............. 251/301 X

FOREIGN PATENT DOCUMENTS 2177990  2/1987  United Kingdom ........... 406/192

*Primary Examiner*—David M. Mitchell
*Assistant Examiner*—Andrew C. Pike
*Attorney, Agent, or Firm*—Bachman & LaPointe

[57] ABSTRACT

In a conveyor conduit comprising at least one valve having a movable closure body, for loose material which is to be pneumatically conveyed, the closure body of the valve is permeable to the conveying air in the closure position of the valve in which it blocks the conduit cross-section for the material being conveyed, in particular for granulate material such as sand.

18 Claims, 3 Drawing Sheets

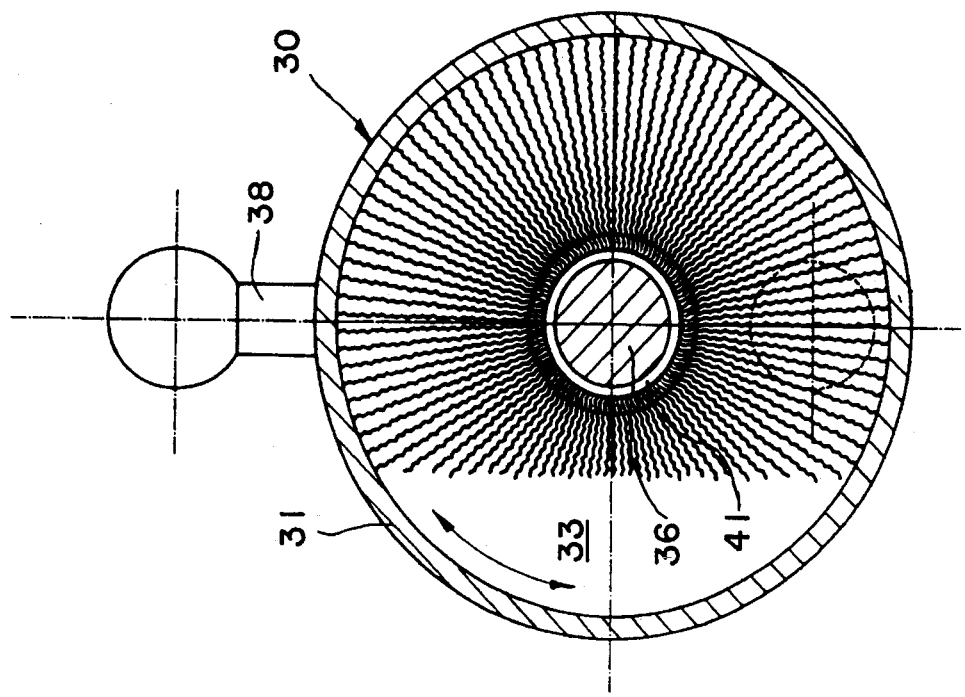
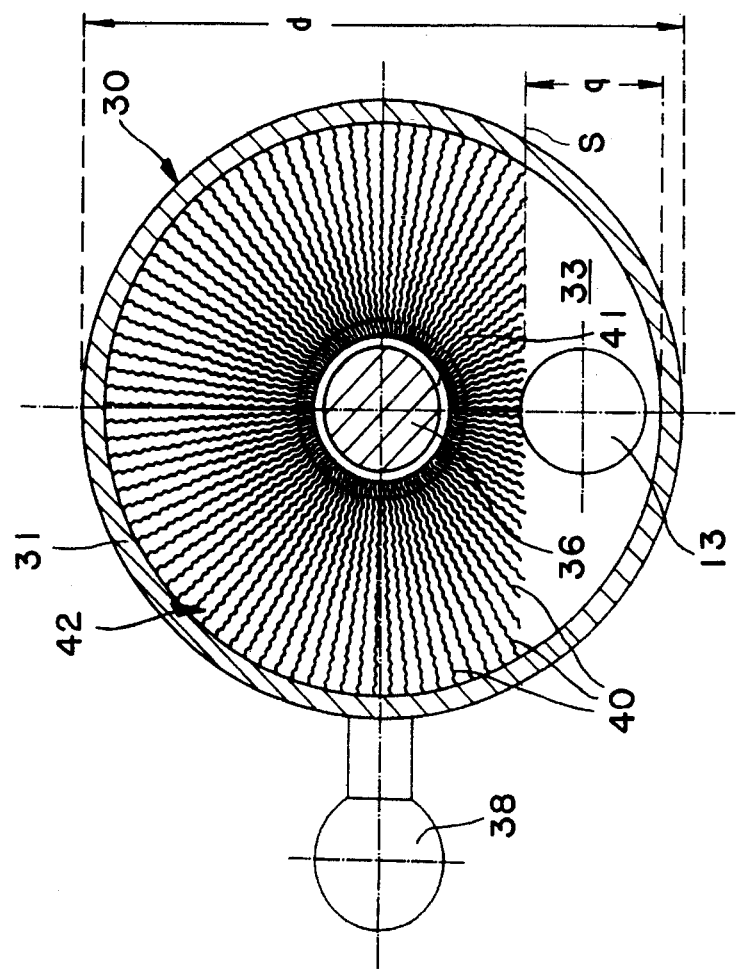

CONVEYOR CONDUIT FOR BULK MATERIAL TO BE PNEUMATICALLY CONVEYED

The invention relates to a conveyor conduit comprising at least one valve having a movable closure member, for loose or bulk material which is to be pneumatically conveyed, in particular for granulate material to be conveyed such as sand.

It is known for example from German patent specification No. 24 43 553 for mobile storage containers to be filled with granular or grain products by means of pneumatic conveying. When the desired degree of filling is reached, a globe-type tap which has a sealing closing effect in the transitional region from the conveyor conduit into the container is closed. Usually a dense-flow conveyor process is selected so that the material flows slowly into the container and only a small amount of conveying air has to be discharged from the container.

The conveying pressure decreases during the movement of the material being conveyed, to the end of the conveyor conduit, to such a degree that the material being conveyed passes at only a low speed into the container to be filled. The conveying air flows away and can be sucked away, as is described for example in the specification of German utility model No. 90 10 408.

If globe-type taps as valves are closed when the desired filling level is reached, the air pressure at the tap rises to the level of the air pressure at the beginning of the conveyor conduit. When the shut-off valve is opened again, that air pressure spontaneously falls and in so doing entrains a large amount of the solid material. That means for example when using such apparatuses for filling the sand storage containers of rail vehicles if, as is usual nowadays, they are equipped with sand scattering devices without sand valves, that:

at the beginning of the filling operation, sand comes out of the braking system and mixes with the often oily surrounding dirt, so that it then has to be expensively disposed of; and the suction removal system cannot be dimensioned to correspond to the flow of conveying air which is actually slight, but must be matched to the air blast which occurs when the valve is opened.

In consideration of those factors the inventor set himself the aim of improving a conveyor conduit as described above and offering sane with a valve which in the closed position retains the product in the conveyor conduit and prevents a build-up in pressure at the valve.

The teaching of the present invention provides for the attainment of that object.

In accordance with the invention the closure body of the valve is to remain permeable to the conveying air, in its closure position of blocking the conduit cross section for the material being conveyed. For that purpose a closure body with passages of a cross section which varies in a chicane-like or baffle-like configuration has proven to be advantageous as flow paths for the conveying air, wherein the chicanes or baffle configurations form blocking means for the material being conveyed.

In accordance with a further feature of the invention, the closure body of the valve is adapted to be taken out of the cross section of the conveyor conduit into an open position, for example to be pivoted or to be displaced linearly or in a helical fashion.

Also in accordance with the invention is a closure body comprising strand-like or cord-like portions which are at least partly movable relative to each other and which provide a configuration which is multi-layer in the conveying direction, consisting of filaments which cover each other over. Preferred for that purpose are bristle-like portions which are fixed at one end and which, in regard to their material, their profile, and the density with which they occupy the brush body formed by them, can be adapted to the properties of the material being conveyed in order effectively to retain solids and to allow conveying air to pass.

An advantageous configuration of the valve provides a valve housing which encloses the closure body or brush body and which crosses the conveyor conduit; it can be provided for use both in the end region of the conveyor conduit and also at any other locations along its extent. Moreover valves with a porous closure body according to the invention may also be used at conveyor conduit switching locations and as a preliminary or upstream closure in relation to other valves, in order for example to ensure a sealing closure effect.

It has been found desirable for the valve housing to be of a cylindrical design configuration and for the valve body to be disposed in the valve housing in such a way that it can be rotated about the center of the housing, in particular on an actuating shaft, between an open and a closed position and can be pivoted in the open position away from the cross section of the conveyor conduit, which cross section is arranged eccentrically in the valve housing. In that arrangement the actuating shaft is to be mounted in the disc-like valve housing and a respective end of each of the valve bristles is to be fixed to the actuating shaft.

In accordance with the invention, a chord can be laid through the approximately round cross section of the closure body, that chord extending outside the actuating shaft and forming a boundary plane for the valve bristles or the like portions of the closure body.

In that respect the maximum spacing of the chord from the periphery of the cylinder of the valve body is to be equal to or somewhat greater than the diameter of the conveyor conduit.

For that purpose the cross section of the conveyor conduit is advantageously arranged adjacent the side wall of the valve housing, that is to say at a spacing relative to the actuating shaft.

The brush body which is preferred as the closure body of the valve is mounted interchangeably on the actuating shaft; the valve bristles are fixed at one end in a shaft ring which is pulled on to the actuating shaft and can thus be interchanged without difficulty.

As already indicated, this valve is most desirably integrated in a filling tube, which forms a filling tip, of the conveyor conduit. The filling tube is intended to simplify sealing connection to a receiving silo for the material being conveyed, for example a braking sand box of a tram or streetcar, for which purpose it is surrounded in per se known manner at its filling tip by an insertion head or pot; the latter defines an annular space which is open towards the end of the filling tip and which is connected to a vent or exhaust conduit. The outside surface of the insertion pot tapers conically in the conveying direction and thus permits sealing contact against the edge of a silo opening.

In accordance with the invention, a holding means serves for mounting the filling tip when not in operation, the holding means having a cap or sleeve device which accommodates the filling tip and which provides a receiving opening for the insertion pot which closes the interior of the cap. The cap can catch the solids-free air which is flowing through the conveyor conduit and feed it by way of the described insertion pot to the exhaust arrangement.

Figure 2:
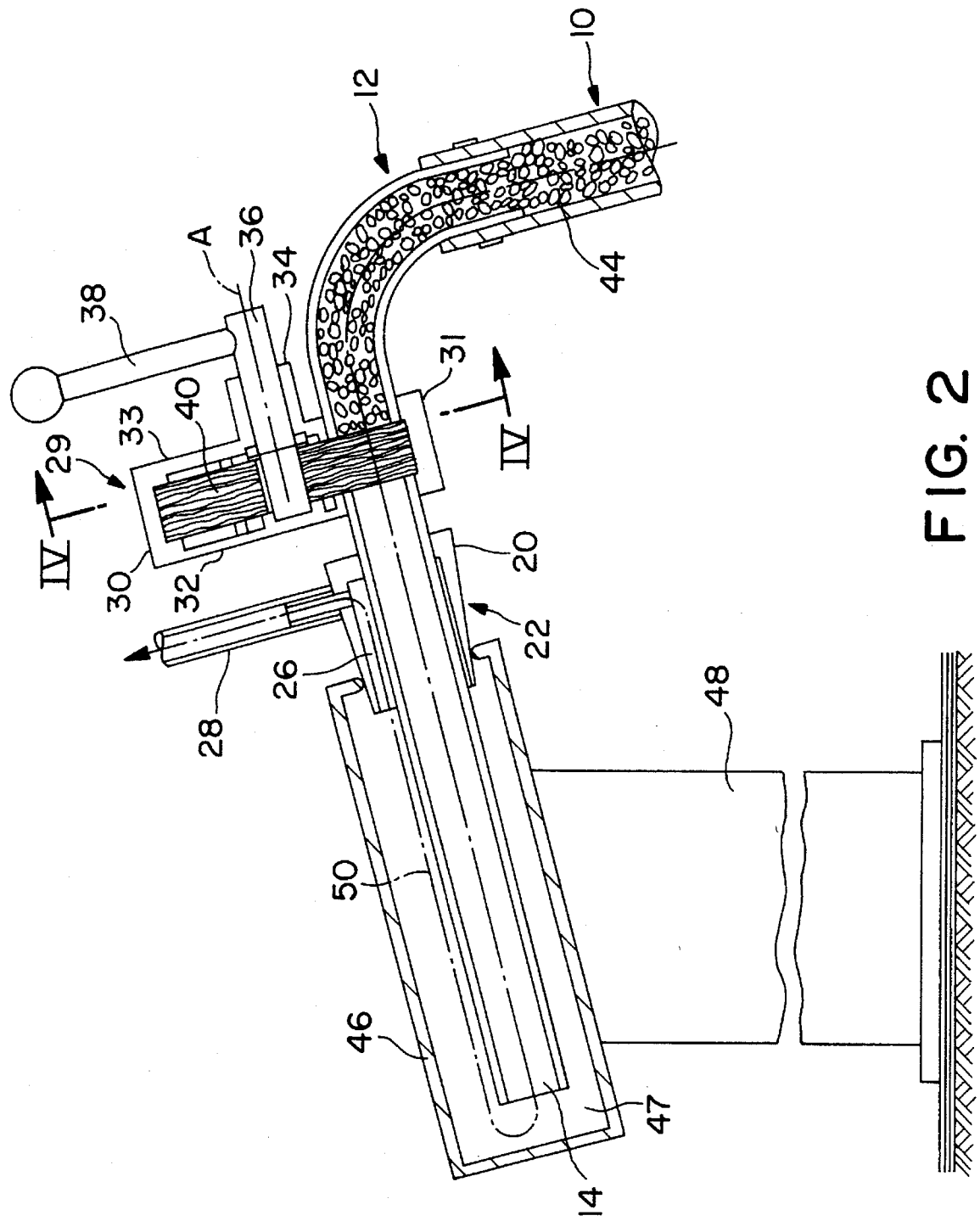

Further advantages, features and details of the invention will be apparent from the following description of preferred embodiments and with reference to the drawing in which:

FIG. 1 is a view in longitudinal section through the end of a pneumatic conveyor conduit with a valve in the opened condition, FIG. 2 is a view in longitudinal section through the end of the conveyor conveyor with the valve closed, FIG. 3 is a view on an enlarged scale in cross section through FIG. 1 taken along line III—III thereof, and FIG. 4 is a view on an enlarged scale in cross section through FIG. 2 taken along line IV—IV thereof.

Referring to FIG. 1, a hose-like conveyor conduit 10 terminates at a curved filling tube 12 having a free filling tip 14 which for example projects into a sand deposit chamber of a streetcar which, for reasons of clarity of the drawing, is indicated only by means of a wall 16. The filling tube 12 passes through the wall 16 in the region of a wall opening 18, against the edge of which an insertion pot 20 which is disposed around the filling tube 12 and which is fixed to same bears sealingly by means of its conical outside surface 22. The insertion pot 20, which is open towards the filling tip 14 by means of its cup bottom 24, defines an annular space 26 which is connected to a suction removal or exhaust conduit 28 which is here attached radially, for removing air which flows out of the sand deposit chamber.

A valve 29 with a disc-like valve housing 30 is fixed in the filling tube 12 upstream of the insertion pot 20 in the conveying direction as indicated by the arrow x. The valve housing 30 having a length a has a side wall 31 of an outside diameter d which is larger than four times the outside diameter e of the filling tube 12.

Extending on an axis A through the center of that circular cross section is an actuating shaft 36 with radial handle 38. The actuating shaft 36 is mounted in the rear wall 32 of the valve housing 30 and a sleeve portion 34 which projects from the front wall 33 of the valve housing. The mouth opening 13 of the curved filling tube portion can be seen in FIG. 3 beneath the actuating shaft 36.

Radial valve bristles 40 project from the actuating shaft 36, with the ends of the radial valve bristles 40 bearing against the cylindrical side wall 31 of the valve housing 30.

The valve bristles 40 which at one end are fixed in a shaft ring 41 form a brush body 42 which can be rotated about the axis A in the valve housing 30 by means of the actuating shaft 36. The brush body 42 which is adapted to the cylindrical valve housing 30 sealingly fills the cross section thereof, but, as can be clearly seen in particular from the cross section in FIGS. 3 and 4, in the illustrated embodiment it is cut off at one side of the shaft along a chord S which is directed parallel to the handle 38, in such a way that, in the open position shown in FIG. 3, it exposes the mouth opening 13 of the filling tube 12 and therewith the passage to the filling tip 14; the spacing q of the chord S, which defines a boundary plane, from the inside surface of the side wall 31 of the valve housing 30 is slightly greater than the diameter e of the filling tube 12.

Pivotal movement of the handle 38 into a vertical position causes the bristle-free area of the cross section of the housing to be moved out of the region of the mouth opening 13 which is covered over by the brush body 42 in the closed position shown in FIG. 4; granulate material 44 being conveyed, which arrives in the conveyor conduit 10, is prevented from reaching the filling tip 14, but conveying air finds its way through the brush body 42.

In the embodiment shown in FIGS. 1 and 2 the closure or brush body 42 performs a rotational movement. In embodiments which are not illustrated, the transitional movement of the closure body 42 may also be rectilinear or helical.

In FIG. 2 the filling tip 14 is in intermediate storage in breaks in operation in a cap 46 which is carried on a support 48 which is fixed to the ground. Here, the conveying air which leaks through the brush body 42 is passed as indicated by the line 50 in the interior 47 of the cap to the annular space 26 and from same to the exhaust conduit 28.

I claim:

1. Apparatus comprising: a conveyor conduit having a conduit cross section for granulate material to be pneumatically conveyed and; at least one valve having a movable closure body, said closure body having a closure position thereof for blocking the conduit cross section and having an open position thereof for opening the conduit cross section; wherein the closure body of the valve is permeable to conveying air in the closure position but blocks the conduit cross section for the material to be conveyed and comprises strand-like portions which are at least partly movable relative to each other.

2. Apparatus as set forth in claim 1, wherein the closure body has passages of a cross section which varies in a chicane-like configuration, as flow paths for the conveying air, which are blocked for the material being conveyed.

3. Apparatus as set forth in claim 1, wherein the closure body of the valve is adapted to be moved out of the conduit cross section conduit into the open position.

4. Apparatus as set forth in claim 1, wherein the strand-like portions are fixed at one end and are movable relative to each other at a free end thereof.

5. Apparatus as set forth in claim 1, wherein the strand-like portions include valve bristles which form a brush body as the closure body of the valve.

6. Apparatus as set forth in claim 5, further including a valve housing of the valve which encloses the closure body and which crosses the conveyor conduit.

7. Apparatus as set forth in claim 7, wherein the valve housing is cylindrical and has a housing center in which the closure body is rotatable about the housing center between the closure and open positions, and in the open position is pivoted away from the conduit cross section, said cross section being arranged eccentrically in the cylindrical valve housing.

8. Apparatus as set forth in claim 7, wherein the closure body is mounted on an actuating shaft.

9. Apparatus as set forth in claim 8, wherein the actuating shaft is mounted in the cylindrical valve housing and one end of each of the valve bristles is fixed to the actuating shaft.

10. Apparatus as set forth in claim 9, wherein the closure body has an approximately round cross section, and wherein a chord is passed through the approximately round cross section of the closure body, said chord extending outside the actuating shaft and forming a boundary plane for the valve bristles.

11. Apparatus as set forth in claim 10, wherein a maximum spacing of the chord from a cylindrical periphery of the valve body is equal to or larger than a diameter of the conveyor conduit.

12. Apparatus as set forth in claim 8, wherein the brush body is mounted interchangeably on the actuating shaft.

13. Apparatus as set forth in claim 8, wherein the valve bristles are fixed at one end in a shaft ring which is drawn onto the actuating shaft.

14. Apparatus as set forth in claim 6, wherein the valve housing has a side wall and wherein the conduit cross section is arranged adjacent the side wall of the valve housing.

15. Apparatus as set forth in claim 1, wherein the valve is integrated into a filling tube which forms a filling tip of the conveyor conduit.

16. Apparatus as set forth in claim 15, wherein the filling tube has an insertion pot which, with the filling tube, defines an annular space which is open towards the filling tip and which is connected to a vent or exhaust conduit.

17. Apparatus as set forth in claim 16, wherein an outside surface of the insertion pot tapers conically in a conveying direction.

18. Apparatus as set forth in claim 16, further including a holding means for the filling tube, and a cap which accommodates the filling tip and which has a receiving opening for the insertion pot which closes a cap interior.

* * * * *